United States Patent [19]

Claassen et al.

[11] Patent Number: 5,159,523

[45] Date of Patent: Oct. 27, 1992

[54] GROUNDING SYSTEM AND DETECTION CIRCUIT FOR FUELING

[75] Inventors: Daniel L. Claassen; Kim W. Norton, both of Wichita, Kans.; Michael A. O'Brien, St. Paul, Minn.

[73] Assignee: Cornerstone Fuels, Inc., Wichita, Kans.

[21] Appl. No.: 602,633

[22] Filed: Oct. 24, 1990

[51] Int. Cl.$^5$ ............................................. H02H 3/14
[52] U.S. Cl. ..................... 361/215; 340/649; 361/216; 361/42
[58] Field of Search ............... 361/42, 49, 215, 218, 361/216; 307/326; 340/649, 652

[56] References Cited

U.S. PATENT DOCUMENTS

| | | |
|---|---|---|
| Re. 25,957 | 2/1966 | Caldwell . |
| 1,230,356 | 6/1917 | Wheaton . |
| 1,524,423 | 1/1925 | Chapman . |
| 1,564,855 | 12/1925 | Jurs ............................. 361/215 |
| 1,600,549 | 9/1926 | Jurs . |
| 1,749,179 | 3/1930 | Davis, Jr. . |
| 2,315,805 | 4/1943 | Mayo et al. . |
| 2,611,862 | 9/1952 | Riddle et al. ............... 340/649 |
| 2,660,717 | 11/1953 | Hood . |
| 2,767,659 | 10/1956 | Greenblatt . |
| 2,911,607 | 11/1959 | Booth . |
| 2,953,147 | 9/1960 | Hornback . |
| 3,013,578 | 12/1961 | Askevold . |
| 3,141,113 | 7/1964 | Munday et al. . |
| 3,160,785 | 12/1964 | Munday . |
| 3,164,747 | 1/1965 | Yahnke . |
| 3,276,615 | 10/1966 | De Pew . |
| 3,289,876 | 12/1966 | De Pew . |
| 3,453,493 | 7/1969 | Godwin, Jr. . |
| 3,457,359 | 7/1969 | Soucy . |
| 3,520,110 | 7/1970 | Knauer . |
| 3,706,008 | 12/1972 | Kremer ........................ 361/49 |
| 3,784,876 | 1/1973 | De Gaston . |
| 3,821,603 | 6/1974 | De La Cierva . |
| 4,005,339 | 1/1977 | Plantard . |
| 4,016,489 | 4/1977 | Adams et al. ............... 324/510 |
| 4,114,622 | 9/1978 | Gonser ......................... 606/35 |
| 4,215,384 | 7/1980 | Elson . |
| 4,541,684 | 9/1985 | Holman et al. . |
| 4,605,984 | 8/1986 | Fiedler ......................... 361/220 |
| 4,642,554 | 2/1978 | Aucoin ......................... 340/649 |
| 4,691,198 | 9/1987 | Mortensen ................... 340/649 |
| 4,720,764 | 1/1988 | Lucas ........................... 361/212 |
| 4,901,195 | 2/1990 | Stemporzewski, Jr. ..... 361/215 |
| 4,942,313 | 7/1990 | Kinzel ........................... 307/326 |
| 5,034,726 | 6/1991 | Biondin ........................ 340/649 |
| 5,105,325 | 4/1992 | Lawrence ..................... 361/42 |

Primary Examiner—Steven L. Stephan
Assistant Examiner—Ben Davidson
Attorney, Agent, or Firm—Moore & Hansen

[57] ABSTRACT

A grounding system and detection circuit comprising a dual grounding configuration having a first or primary grounding means and a second or default grounding means, and a detection circuit connected to both the first and second grounding means. The first or primary grounding means may be any conventional manual grounding system such as a grounding cable attached to the frame, body, or fuselage of an aircraft, vessel, or vehicle. The second or default grounding means is automatically attached to the aircraft, vessel, or vehicle during fueling or fuel transfer, with the detection circuit positively detecting whether the first or primary grounding means is conductively connected to that same aircraft, vessel, or vehicle. A supplemental detection circuit may be utilized to verify that the first or primary grounding means is connected to the aircraft, vessel, or vehicle prior to connection of the second or default grounding means. The detection circuit may be coupled to an indicator to identify a properly grounded configuration to the operator, and to an interrupt or control means which prevents operation of a fuel dispensing system unless a proper grounding configuration is observed.

28 Claims, 1 Drawing Sheet

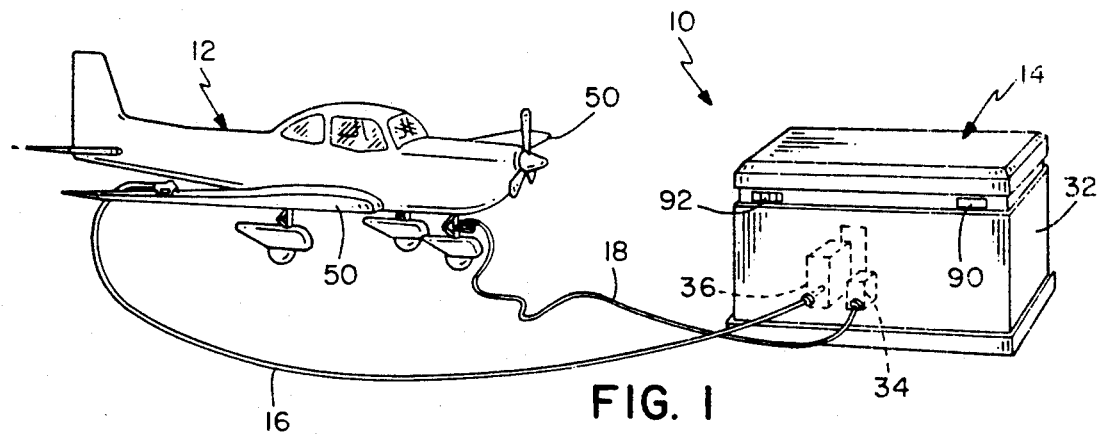
FIG. 1
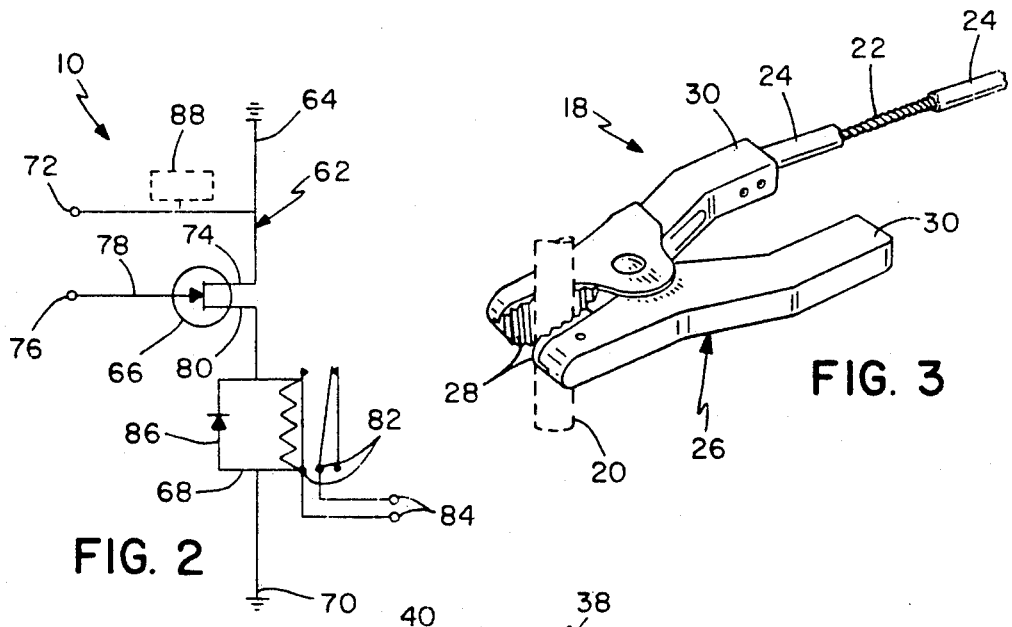
FIG. 2
FIG. 3
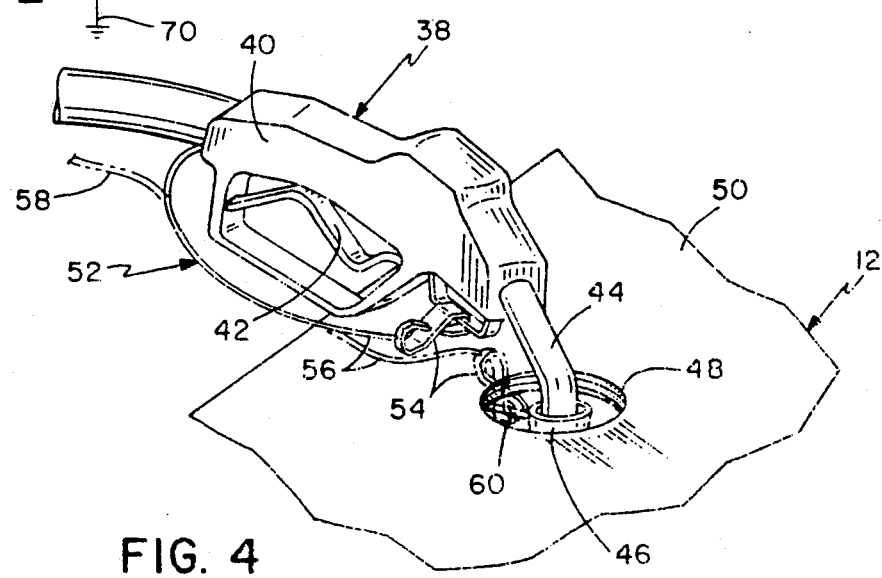
FIG. 4

GROUNDING SYSTEM AND DETECTION CIRCUIT FOR FUELING

BACKGROUND OF THE INVENTION

This invention relates generally to electrical grounding systems for aircraft, marine vessels, or ground vehicles to discharge static accumulation prior to fuel transfer, and particularly to an electronic circuit for detecting a particular grounding configuration and controlling fuel transfer in aircraft self-service fueling.

It is known that aircraft, marine vessels, and ground vehicles can accumulate significant electrostatic charges during transport. It is also known that petroleum distillates and other hydrocarbon fluids will themselves accumulate significant electrostatic charges when the fluids are transferred along the surface of a solid such as through insulated conduits or within storage tanks and processing equipment. Consequently, a significant hazard of explosion or fire is presented by the possibility of electrostatic discharge occurring proximate to a fuel reservoir, especially during fuel transfer or in preparation for fueling vehicles.

The accumulated electrostatic charge potential in aircraft, marine vessels, or ground vehicles depends on many variables, including their mass, the quantity and molecular properties of the contained fluid, the dielectric properties of that fluid and the reservoir, the intensity and duration of any movement between the fluid, container, vehicle, and environment, and the relative rates of accumulation and dissipation of that static charge In comparison, relatively accurate calculations regarding the accumulation and dissipation of electrostatic charges have been made for fuel storage tanks and fuel transfer conduits. Representative examples of systems for monitoring the accumulation or controlling the discharge of electrostatic charges in fuel storage tanks, fuel transfer conduits, and fuel metering systems include U.S. Pat. Nos. 3,141,113 and 3,160,785 to Munday, 3,453,493 to Godwin, 3,013,578 to Askevold, 2,315,805 to Mayo, 2,953,147 to Hornback, 3,821,603 to De La Cierva, 3,164,747 to Yahnke, and 3,784,876 to De Gaston. These systems include methods for the electrical grounding of the fluid and reservoir or conduit, controlling fluid flow rates as a function of accumulated electrostatic charge, neutralizing the charge using ionizing radiation or a counteracting electromagnetic field, and other means such as anti-static additives. In general, these systems are relatively complex and expensive, and are unsuitable for use in connection with a mobile reservoir such as an aircraft, marine vessel, or ground vehicle.

Various simple grounding systems have been devised to prevent the accidental or untimely discharge of an accumulated electrostatic charge in the proximity of a volatile inflammable fuel reservoir in ground vehicles such as tank trucks U.S. Pat. No. 1,600,549 to Jurs discloses the method of connecting a metal grounding chain to the reservoir and dragging the opposing end of that chain on the ground as the vehicle travels to dissipate the accumulated electrostatic charge U.S. Pat. No. 1,564,855 to Jurs discloses grounding both the fuel supply hose and the fuel tank in parallel through a common grounding wire, as well as grounding the vehicle using the chain disclosed in the Jurs '549 patent. The Jurs '855 patent provides a release mechanism which prevents opening the fill cap until the reservoir grounding wire has been connected U.S. Pat. No. 1,524,423 to Chapman discloses grounding the reservoir and the fluid within the reservoir in series through a common grounding wire. Various safety-related improvements have also been made in the grounding wires and mechanical couplings between those grounding wires and the fuel reservoirs, representative examples of these types of improvements being shown in U.S. Pat. Nos. 2,911,607 to Booth and 1,749,179 to Davis. It is also known to make the fuel supply hose electrically conductive, whereby accumulated electrostatic charges will be conducted to a grounded frame member, as shown in U.S. Pat. No. 1,230,356 to Wheaton.

While these systems have generally proven effective for their intended uses, they do present some drawbacks. It is incumbent upon the operator to ensure that a proper grounding connection is established prior to any fuel transfer, and the process of physically connecting the grounding wires in close proximity to the open fuel inlet port of the reservoir may produce a electrostatic discharge that will ignite fuel or vapors remaining within the reservoir.

Specialized requirements for aircraft fueling stations are mandated pursuant to the authority of the Federal Aviation Administration and airport regulations. Although current regulations do not encompass a mandatory grounding system or dictate equipment specifications for fuel dispensing systems, it is incumbent upon the operator of a fueling station to ground both the aircraft and the fuel supply hose prior to initiating fueling. The grounding configuration most frequently utilized comprises dual grounding cables for the aircraft and fuel supply hose. The aircraft grounding cable may be coupled to the frame or fuselage of the aircraft using a clamp, or a pin connector attached to the distal end of the grounding cable and a mating receptacle mounted on the aircraft frame or fuselage. One representative example of such a pin and receptacle assembly for use in aircraft grounding is shown in U.S. Pat. No. 4,541,684 to Holman. The fuel supply hose may be grounded using a separate grounding cable attached to the fuel hose or nozzle, or may include an insulated but internally grounded fuel hose which grounds either the fuel hose or the nozzle or both. If the nozzle or fuel hose are electrically conductive and contact the fuel inlet port on the aircraft (or a portion of the fuel reservoir within the aircraft), those elements may additionally be grounded by the fuel hose grounding cable. Representative examples of grounded fuel supply hoses are shown in U.S. Pat. Nos. 3,457,359 to Soucy, 3,520,110 to Knauer, and 4,215,384 to Elson. In situations where the fuel supply nozzle is not electrically conductive, such as an insulated or polymeric nozzle, it is known to provide an electrically conductive connection between the fuel inlet port and the fuel source through such device as shown in U.S. Pat. No. 4,005,339 to Plantard.

As with grounding systems for tank trucks or other fuel transport vehicles, these grounding systems for aircraft rely upon an operator to properly complete the grounding connections to the aircraft prior to initiating fueling. This step may be forgotten or disregarded when the operator is poorly supervised, distracted, or rushed. Moreover, connecting the grounding wires of the fuel supply hose in close proximity to the open fuel inlet of the reservoir prior to connecting the aircraft grounding wire may still produce a electrostatic discharge that will ignite fuel or vapors remaining within the reservoir. Because of these risks associated with fueling operations, current Federal Aviation Administration guidelines require fueling to be performed by fueling stations whose operators have met minimum training or certification standards, and for which some on-site supervisory authority is therefore usually present. However, these training standards and the presence of on-site supervisory authority do not ensure compliance with proper grounding protocols by fueling station operators, and those guidelines stand as an impediment to designing more effective self-service fueling systems.

It is similarly known in military and commercial aviation maintenance applications to use a triangular bonding configuration whereby both the aircraft and equipment are grounded to a common ground and to one another. However, as with conventional manual grounding systems, the triangular bonding method relies on the operator to ensure that proper grounding contacts are attained. It is further known to incorporate time delays on fuel dispensing and pumping systems that utilize leak detection equipment, in order to maintain the solenoid valves in a closed position for a predetermined time until the leak detection equipment initially stabilizes and the pump reaches operating pressure. The time delay systems do not respond to a specified condition such as proper grounding of the aircraft or vehicle, but rather automatically engage the fuel dispensing system after a preset time has elapsed.

U.S. Pat. No. 2,767,659 to Greenblatt discloses a device for automatically grounding tank trucks using electrically conductive spring members that contact the undercarriage of a tank truck when it is properly positioned for fuel transfer and dissipate accumulated electrostatic charge. The device includes a contact assembly that can be used to disable the fuel delivery system until the spring members are depressed by contact with the vehicle.

However, systems such as the Greenblatt '659 device require significant uniformity in the dimensions of the tank trucks and the structure of their conductive undercarriages, and are therefore unsuitable for non-commercial vehicles, and other applications such as aircraft or marine vessels. Moreover, systems such as Greenblatt '659 respond to physical contact, and while the spring members and associated intrinsic linkages may be properly grounded, there is no certainty that the surface of the undercarriage will form an electrically conductive contact with the spring members.

Various types of electronic circuits (such as ground fault indicators and the like) can be utilized to indicate the electrically grounded condition of the circuit itself or an external object. U.S. Pat. No. 2,660,717 to Hood discloses a common-point rectifier circuit used to sense a live grounded connection in a conductive device used in a surgical operating room or industrial plant, and alternately to drain accumulated static charge away from a patient or workpiece. U.S. Pat. No. 2,611,862 to Riddle discloses a passive bridge rectifier circuit having tuned and balanced impedances on opposing sides of the bridge, with the bridge becoming unbalanced and activating a relay or signal lamp when the grounding cable connected to one side of the bridge is attached to an external object having an impedance. Riddle '862 further suggests using the circuit to prevent loading of a tank if the grounding cable is not connected. U.S. Pat. No. Re. 25,957 to Caldwell discloses a simple bridge rectifier circuit and signal lamp connected to a grounding cable which is used to ground a tank truck or similar object.

While suitable as status indicators in some applications, these circuits present several drawbacks for use in grounding systems associated with fueling operations, and particularly with dual grounding systems such as for aircraft. Hood '717 is designed to detect and identify a grounded current sufficient to cause muscular contraction or reflex if that current is transmitted from the device through a body, rather than passively indicating the grounded condition of the device. A circuit such as Riddle '862 can identify whether the grounding cable has been attached to some object using a much lower RF signal, but since the bridge will be unbalanced by attaching the cable to grounded or ungrounded objects of almost any impedance, the circuit will not identify whether the grounding cable has been attached to the particular object desired to be grounded. Caldwell '957 requires a two-conductor grounding cable, with the opposing jaws of the clamp acting as the poles of a simple switch to simultaneously complete the grounding connection and unbalance the bridge circuit when the clamp is connected to any electrically conductive object.

These types of ground indicating circuits are relatively complex and expensive to assemble, and require significant tuning and adjustment to operate properly. The circuits can be sensitive to adverse environmental conditions and damaged by overloads. Moreover, such circuits may be easily circumvented if an operator wishes to intentionally disregard grounding an aircraft in compliance with an established fueling protocol, or as a result of other equipment tampering. This can be particularly hazardous in designing self-service fueling systems, since once circumvented the circuit will remain inactive as a ground status indicator or protocol reminder for subsequent operators, and it is anticipated that many operators will use the self-service fueling system between inspections by a supervisory authority.

BRIEF SUMMARY OF THE INVENTION

It is therefore one object of this invention to design an electrical grounding system and detection circuit particularly suited for applications such as self-service fueling of aircraft, marine vessels, and ground vehicles.

It is a related object of this invention to design the above grounding system and detection circuit so as to be particularly useful in dual grounding configurations.

It is another object of this invention to design the above grounding system and detection circuit such that it provides a greater degree of failsafe protection against intentional circumvention or tampering, and operates in a manner that is transparent to the user.

It is a distinct object of this invention to design the above grounding system and detection circuit so that it may be utilized both as a ground status indictor and to directly control the operation of a fuel dispensing system.

It is yet another object of this invention to design the above grounding system and detection circuit such that it is relatively inexpensive to manufacture and easy to incorporate into existing grounding systems and fuel dispensing systems.

Briefly described, the grounding system and detection circuit of this invention comprises a dual grounding configuration having a first or primary grounding means and a second or default grounding means, and a detection circuit connected to both the first and second grounding means. The first or primary grounding means may be any conventional manual grounding system such as a grounding cable attached to the frame, body, or fuselage of an aircraft, vessel, or vehicle. The second or default grounding means is automatically attached to the aircraft, vessel, or vehicle during fueling or fuel transfer, with the detection circuit positively detecting whether the first or primary grounding means is conductively connected to that same aircraft, vessel, or vehicle. A supplemental detection circuit may be utilized to verify that the first or primary grounding means is connected to the aircraft, vessel, or vehicle prior to connection of the second or default grounding means. The detection circuit may be coupled to an indicator to identify a properly grounded configuration to the operator, and to an interrupt or control means which prevents operation of a fuel dispensing system unless a proper grounding configuration is observed.

BRIEF DESCRIPTION OF THE DRAWINGS

FIG. 1 is a perspective view of the grounding system and detection circuit of this invention incorporated into a self-service fueling station for aircraft, the fueling station including a fuel dispensing system having a fuel hose and grounding cable connected to an aircraft to be fueled;

FIG. 2 is a schematic diagram of the grounding system and detection circuit of this invention;

FIG. 3 is a perspective view of one embodiment of the first or primary grounding means of the present invention comprising a conventional grounding cable and clamp connected to a frame member of the aircraft of FIG. 1; and FIG. 4 is a perspective view showing alternate connections for the second or default grounding means of the present invention including a conventionally grounded fuel hose and nozzle assembly received within the fuel inlet port of the aircraft of FIG. 1.

DESCRIPTION OF THE PREFERRED EMBODIMENT

The grounding system and detection circuit of this invention are shown in FIGS. 1-4 and referenced generally therein by the numeral 10.

The grounding system and detection circuit 10 are particularly suited for self-service fueling of aircraft 12, and an aircraft 12 shall serve herein as an exemplary environment for describing the best mode contemplated for practicing the invention as disclosed. It may be readily appreciated that the grounding system and detection circuit 10 may also be utilized in other related applications such as marine vessels, tanker trucks, or similar ground transport vehicles.

Referring particularly to FIG. 1, it may be seen that the aircraft 12 is disposed proximate to a fuel dispensing system 14. The fuel dispensing system 14 will generally include an underground or remote fuel supply (not shown), a pumping system (not shown) for transferring fuel from the remote fuel supply to and through a fuel hose 16 under pressure, and a central processing unit or CPU (not shown) for controlling the operation of the fuel dispensing system 14 and calculating such information as the quantity and price of the fuel dispensed.

Referring particularly to FIGS. 1 and 3, it may be seen that a first or primary grounding means 18 is removably but engagingly connected to a portion of the body, fuselage, or frame member 20 of the aircraft 12. The first or primary grounding means 18 may comprise any conventional or suitable grounding system, with the embodiment of the first or primary grounding means 18 shown serving only as a representative but preferred example. The first or primary grounding means includes an electrically conductive grounding cable 22 coated with an insulating protector 24, the distal end of the cable 22 being fixed connected to a spring-loaded clamp 26 having conductive jaws 28 which may be opened or separated sufficiently to receive the frame member 20 therebetween when pressure is exerted on the pair of opposing insulated handles 30. The jaws 28 are electrically connected to the cable 22 such that a conductive path is created between the frame member 20, jaws 28, and cable 22. One example of a suitable cable 22 is fabricated from 3/32" diameter 7×7 stainless steel cable coated to 5/32" outside diameter with compounded polyester to be kink-resistant, and providing an electrical resistance of approximately 8.5 ohms per 100 feet. One example of a suitable clamp 26 is fabricated from a die cast aluminum alloy having 5 ohms or less resistance between the jaws 28 and handle 30 to which the distal end of the cable 22 is connected, and a torsion spring which provides jaw pressures ranging from 30–40 lbs. when gripping a frame member 20 having a nominal diameter ranging from 0.5"–0.625".

The proximal end of the cable 22 is received through an aperture in the cabinet 32 surrounding the components of the fuel dispensing system 14, and the cable 22 is attached to and wound on a self-rewinding reel 34 or other suitable holder.

Referring to FIG. 1, the proximal end of the fuel hose 16 similarly extends through an aperture in the cabinet 32 and is connected to the fuel dispensing system 14 in line with a fuel dispensing control and metering system 36 for measuring and controlling the volume of fuel dispensed through the fuel hose 16. Referring particularly to FIGS. 1 and 4, it may be seen that the fuel hose 16 extends to a distal end which is connected to a nozzle assembly 38 having a housing 40, actuation lever 42, and discharge spout 44. The discharge spout 44 is received within the neck 46 of a fuel inlet port 48 on the aircraft 12 conventionally located proximate to one or both wings 50 of the aircraft 12. The neck 46 of the fuel inlet port 48 is fluidly connected to a fuel reservoir or tank (not shown) conventionally disposed within or adjacent to the wings 50 of the aircraft 12.

Referring particularly to FIG. 4, it may be seen that a second or default grounding means 52 is removably but engagingly connected to a portion of the fuel hose 16 and nozzle assembly 38. The second or default grounding means 52 may comprise any conventional or suitable grounding system, with the embodiment of the second or default grounding means 52 shown serving only as a representative example of one alternate embodiment.

For example, the second or default grounding means 52 may include an internally grounded fuel hose 16 having a grounding cord or conductive filaments (not shown) extending the length thereof and covered by a protective insulating sheath. In such case, the grounding cord or conductive filaments may be directly and conductively coupled to the housing 40 of the nozzle assembly 38, and in turn to the discharge spout 44. As such, an electrically conductive path may be formed from the cord or conductive filaments within the fuel hose 16 to the housing 40 of the nozzle assembly 38, discharge spout 44, electrically conductive neck 46 of the fuel inlet port 48, and to the fuel reservoir (not shown) within the aircraft 12. This electrically conductive path may continue to the body, fuselage, or the frame member 20 of the aircraft.

As such, the second or default grounding means 52 would be completely automatic, since placement of the discharge spout 44 of the nozzle assembly 38 within and contacting the neck 46 of the fuel inlet port 48 would necessarily create a conductive connection with the grounding cord or conductive filaments.

Alternately, some conventional form of a manual grounding connection may be utilized for the second or default grounding means 52. In FIG. 4, it may be seen that a second clamp 54 attached to a second grounding cable 56 could be connected to the housing 40 of the nozzle assembly 38 or directly to the grounding cord or conductive filaments imbedded within the fuel hose 16, or through a separate grounding cable 58 having a proximal end grounded within the cabinet 32 of the fuel dispensing system 14. Depending upon the configuration desired, the second clamp 54 may be selectively attached to the housing 40 of the nozzle assembly 38, or to a conductive fixture 60 disposed within or near the fuel inlet port 48 and electrically connected to either the neck 46 or body, fuselage or frame of the aircraft 12, or both.

As such, the second or default grounding means 52 provides some automatic or manual method of grounding the fuel hose 16 or nozzle assembly 38, and providing an electrically conductive contact with the fuel inlet port 48 or body, fuselage, or frame of the aircraft 12 in series or parallel with the electrical grounding of the fuel hose 16 or nozzle assembly 38.

It should be understood that an automatic grounding method for the second or default grounding means 52 is preferred to overcome the disadvantages of requiring an additional manual operation prior to initiating fueling, and to minimize the possible variations encountered in different types and designs of fuel inlet ports 48, aircraft 12, and conventional fuel hoses 16 and nozzle assemblies 38.

Referring particularly to FIG. 2, the preferred detection circuit 62 of the grounding system and detection circuit 10 of this invention is shown. The detection circuit 62 comprises a DC input voltage or DC power source 64 with a maximum voltage on the order of 6 volts, a stimulus responsive electronic current gate means such as a field-effect transistor (FET) 66, a microrelay 68, and a ground 70.

A first contact or terminal 72 is disposed between the input voltage source 64 and the source 74 of the FET 66. The first or primary grounding means 18 is connected to the first terminal 72. A second contact or terminal 76 is connected to the gate 78 of the FET 66, and the second terminal 76 is in turn connected to the second or default grounding means 52. The drain 80 of the FET 66 is connected to the microrelay 68, and through the microrelay 68 to ground 70.

The FET 66 is preferably a discrete or unipolar junction field-effect transistor (JFET) of the symmetrical N-channel type. A positive voltage applied to the gate 78 of the FET 66 will open the channel between the source 74 and drain 80, the current flowing through the channel being proportional to the voltage applied to the gate 78. In this application, the JFET has the advantage of operating by applied voltage, whereas bipolar transistors and rectifiers respond to current at the control terminal. One symmetrical silicon N-channel JFET that has proven suitable has a pinch off voltage ($V_P$) of $-6$ volts, a drain current ($I_{DDS}$) for $V_{GS}32\ 0$ of approximately 20 mA, and a reverse gate leakage on the order of $-100$ pA. It should be noted that in a symmetrical JFET, the source 74 and drain 80 may be effectively interchanged. The FET 66 and associated components of the detection circuit 62 are preferably sealed within a plastic or epoxy compound to render the components explosion proof and protect those components from environmental conditions.

The microrelay 68 should therefore have a response or activation cutoff near the source voltage and current, and definitely well above the $I_{DDS}$ of 20 mA, and have contacts 82 rated for 120V AC. The microrelay 68 includes two output contacts or terminals 84.

It may then be seen that when the first or primary grounding means 18 is connected to the body, fuselage, or frame member 20 of the aircraft 12, and the second or default grounding means 52 is connected to the fuel hose 16, nozzle assembly 38, or aircraft 12, a closed circuit applying an electric potential or voltage to the gate 76 of the FET 66 is formed. The FET 66 thereby acts as a switch means which responsively permits current to flow to the microrelay 68 when a predetermined grounding configuration is attained, closing the contacts 82 of the microrelay 68 and completing an external circuit through the output terminals 84. The microrelay 68 and FET 66 may optionally be protected from unintended reverse current using a diode or LED 86.

If a proper dual grounding configuration between the aircraft 12 and fuel hose 16 or nozzle assembly 38 is formed, the microrelay 68 will be actuated and close an external circuit connected to the output terminals 84, with the microrelay thereby acting as a switch means.

In some applications, it may be preferable to provide a means to ensure that the first or primary grounding means 18 is connected to the aircraft 12 before the second or default grounding means 52 is connected to the aircraft 12 (i.e., prior to the nozzle assembly 38 contacting or being inserted into the neck 46 of the fuel inlet port 48) to isolate any initial sparks to the area of the clamp 26 and frame member 20 rather than the fuel reservoir. In such a case, a supplemental detection circuit 88 such as a passive bridge rectifier circuit may be connected to the grounding cable 22 or terminal 72, the supplemental detection circuit 88 being connected to a microrelay or similar means (not shown) which controls a locking and release mechanism preventing the nozzle assembly 38 from being removed from its cradle (not shown) on the cabinet 32 of the fuel dispensing system 14 until the grounding cable 22 has been connected to the aircraft 12. Proper grounding of the aircraft 12 by attaching the grounding cable 22 would activate the supplemental detection circuit 88 to release the locking mechanism and permit removal of the nozzle assembly 38 from its cradle. Alternately, removal of the nozzle assembly 38 from the cradle prior to connection of the first or primary grounding means 18 could activate a visible or audible warning signal 90.

The fuel dispensing control and metering system 36 preferably includes a valve (not shown) such as a solenoid valve which may be responsively actuated or deactuated either by the CPU or by closing or opening the external circuit formed with the output terminals 84 connected to the microrelay 68. As such, with the external circuit open, no fuel will be dispensed through the valve or fuel hose 16 unless a proper dual grounding configuration is attained, and the microrelay 68 is actuated to open the solenoid valve. When a proper dual grounding configuration is attained, a visible or audible indicator 92 connected to the output terminals 84 of the microrelay 68 may be energized. Any break or disconnection of the proper dual grounding configuration will also result in voltage to the gate 78 being interrupted, thus closing the channel of the FET 66 and deactivating the microrelay 68, and thereby immediately closing the solenoid valve to terminate fuel transfer.

While the preferred embodiment of the above grounding system and detection circuit 10 have been described in detail with reference to the attached drawing Figures, it is understood that various changes and adaptations may be made in the grounding system and detection circuit 10 without departing from the spirit and scope of the appended claims.

What is claimed is:

1. A grounding system and detection circuit for use in grounding an object such as an aircraft, vessel, or vehicle during a transfer of a fluid to or from a reservoir associated with said object by a fuel dispensing system, and further for use in identifying a predetermined grounding configuration for said object prior to or during said transfer, said reservoir having a fuel port, said fuel dispensing system including a fuel hose having a spout which fluidly communicates with said fuel port of said reservoir, said grounding system and detection circuit comprising:

a power supply capable of producing a current;
   a ground contact, said ground contact being electrically connected to said power supply;
   a channel means electrically connected to and disposed between said power supply and said ground contact and being capable of responsively permitting said current to flow through said channel means, said channel means further having a gate means associated therewith for controlling the flow of said current through said channel means in response to a stimulus;
   a first grounding means, said first grounding means being electrically connected to said power supply and to said ground contact;
   a second grounding means, said second ground means being electrically connected to said power supply and to said ground contact; and
   relay means, said relay means being electrically connected to said channel means and being responsively actuated by said current flowing through said channel means,
   whereby the first grounding means and the second grounding means are connected to the object in the predetermined grounding configuration such that the stimulus is provided through the first grounding means and the second grounding means and the object to the gate means when said predetermined grounding configuration is attained, one of the first grounding means or the second grounding means being electrically connected to the object through at least one of the fuel port, fuel hose, or spout, the gate means thereby permitting the current to flow through the channel means to actuate the relay means in response to the stimulus, the relay means thereby controlling activation or deactivation of an external circuit electrically connected to the relay means.

2. The grounding system and detection circuit of claim 1 wherein the fuel dispensing system includes a valve means for controlling the transfer of the fuel to or from the reservoir, said valve means being operatively connected to and actuated or deactuated by the external circuit in response to the activation or deactivation of the external circuit.

3. The grounding system and detection circuit of claim 1 wherein the grounding connection comprises an electrically conductive grounding cable which is selectively and removably connected to the object in the predetermined grounding configuration.

4. The grounding system and detection circuit of claim 1 wherein the second grounding connection comprises a default grounding connection which is automatically and removably connected to the object in the predetermined grounding configuration when the spout fluidly communicates with the fuel port.

5. The grounding system and detection circuit of claim 1 wherein the channel means and the gate means are contained within a transistor.

6. The grounding system and detection circuit of claim 5 wherein the transistor is a field effect transistor.

7. The grounding system and detection circuit of claim 6 wherein the field effect transistor is an N-channel type field effect transistor.

8. The grounding system and detection circuit of claim 6 wherein the field effect transistor is a unipolar junction type field effect transistor.

9. The grounding system and detection circuit of claim 1 wherein the field effect transistor is a symmetrical junction type field effect transistor.

10. The grounding system and detection circuit of claim 6 wherein the field effect transistor is at least partially composed of silicon.

11. The grounding system and detection circuit of claim 1 wherein the stimulus is an electric potential.

12. The grounding system and detection circuit of claim 11 wherein the electrical potential is a direct current.

13. The grounding system and detection circuit of claim 11 wherein the electric potential is on an order of 6 volts.

14. The grounding system and detection circuit of claim 1 wherein the stimulus is produced by the power supply.

15. The grounding system and detection circuit of claim 1 wherein the power supply produces a DC electric potential and the current is a DC current.

16. The grounding system and detection circuit of claim 1 wherein the relay means includes a microrelay.

17. The grounding system and detection circuit of claim 1 wherein the external circuit includes indicator means operatively connected with the relay mean to responsively indicate that the predetermined grounding configuration has been attained.

18. The grounding system and detection circuit of claim 1 further comprising:

a supplemental detection circuit, said supplemental detection circuit being electrically connected to the first grounding means and a second external circuit, said supplemental detection circuit being capable of detecting that the first grounding means is conductively connected to the object and activating the second external circuit.

19. The grounding system and detection circuit of claim 18 wherein the supplemental detection circuit includes a balanced impedance bridge rectifier circuit.

20. A grounding system and detection circuit for use in grounding an object such as an aircraft, vessel, or vehicle during a transfer of a fluid to or from a reservoir associated with said object by a fuel dispensing system, and further for use in identifying a predetermined grounding configuration for said object prior to or during said transfer, said reservoir having a fuel port, said fuel dispensing system including a fuel hose having a spout which communicates with said fuel port of said reservoir, said grounding system and detection circuit comprising:

- a power supply capable of producing a current;
- a ground contact, said ground contact being electrically connected to said power supply;
- a channel means electrically connected to and disposed between said power supply and said ground contact and being capable of responsively permitting said current to flow through said channel means;
- a gate means electrically connected to and associated with said channel means for controlling the flow of said current through said channel means in response to a stimulus;
- a first grounding means, said first grounding means being electrically connected to said power supply and to said ground contact;
- a second grounding means, said second ground means being electrically connected to said power supply and to said ground contact; and
- a relay means, said relay means being electrically connected to said channel means and being responsively actuated by said current flowing through said channel means,
- whereby the first grounding means and the second grounding means are connected to the object in the predetermined grounding configuration such that the stimulus is provided through the first grounding means and the second grounding means and the object to the gate means when said predetermined grounding configuration is attained, one of the first grounding means or the second grounding means being electrically connected to the object through at least one of the fuel port, fuel hose, or spout, the gate means thereby permitting the current to flow through the channel means to actuate the relay means in response to the stimulus, the relay means thereby controlling activation or deactivation of an external circuit electrically connected to the relay means.

21. In a fuel dispensing system for transferring a fuel to a reservoir associated with an aircraft, vessel, or vehicle and grounding said aircraft, vessel, or vehicle to a ground contact, said aircraft, vessel, or vehicle having a body, fuselage, or frame member, said reservoir having a fuel port, said fuel dispensing system including a valve means and a fuel hose having a spout which communicates with said fuel port of said reservoir, the improvement comprising:

- a primary grounding means, said primary grounding means being electrically connected to the ground contact and selectively and conductively connected to the body, fuselage, or frame member of the aircraft, vessel, or vehicle;
- a default grounding means, said default grounding means being electrically connected to the ground contact and to at least one of the fuel hose, the spout, the fuel port or a combination thereof such that said default grounding means is conductively connected to said primary grounding mean through the body, fuselage, or frame member of the aircraft, vessel, or vehicle;
- a power supply capable of producing a current, said power supply being electrically connected to at least one of said primary grounding means or said default grounding means;
- a relay means electrically connected to said power supply and to the valve means of the fuel dispensing system; and
- an electronic gate means electrically connected to and between said power supply and said relay means, said electronic gate means further being electrically connected to said default grounding means or said primary grounding means or both, said electronic gate means being capable of permitting said current to flow from said power supply through said electronic gate means to said relay means in response to a stimulus conducted between the primary ground means and the default ground means through at least a portion of the aircraft, vessel, or vehicle,
- wherein the primary grounding means is selectively and conductively connected to at least one of the body, fuselage, or frame member of the aircraft, vessel, or vehicle and the default grounding means is selectively and conductively connected to at least one of the fuel hose, spout, fuel port, or reservoir such that said default grounding means is electrically and conductively connected to said one of the body, fuselage, or frame member to which the primary grounding means is connected, the stimulus provided through the primary grounding means and the default grounding means thereby actuating the electronic gate means when the predetermined grounding configuration is attained, the electronic gate means permitting the current to flow therethrough and activate the relay means in response to the stimulus to responsively actuate or deactuate the valve means.

22. The fuel dispensing system of claim 21 wherein the default grounding system is automatically and conductively connected to the one of the body, fuselage, or frame member to which the primary grounding means is connected when the spout is placed in fluid communication with the fuel port.

23. The fuel dispensing system of claim 21 wherein the electronic gate means includes a field effect transistor.

24. The fuel dispensing system of claim 23 wherein the field effect transistor is an N-channel junction type field effect transistor.

25. In a fuel dispensing system for transferring a fuel to a reservoir associated with an aircraft, vessel, or vehicle and grounding said aircraft, vessel, or vehicle to a ground contact, said aircraft, vessel, or vehicle having a body, fuselage, or frame member, said reservoir having a fuel port, said fuel dispensing system including a fuel hose having a spout which may communicate with said fuel port of said reservoir, the improvement comprising:

- a primary grounding means, said primary grounding means being electrically connected to the ground contact and selectively and conductively connected to the body, fuselage, or frame member of the aircraft, vessel, or vehicle;
- a default grounding means, said default grounding means being electrically connected to the ground contact and to at least one of the fuel hose, the spout, the fuel port or a combination thereof such that said default grounding means is conductively connected to said primary grounding means through the body, fuselage, or frame member of the aircraft, vessel, or vehicle;
- a detection means electrically connected to said default grounding means or said primary grounding means or both, said detection means being capable of producing a stimulus through said default grounding means or said primary grounding means or both responsive to the predetermined grounding configuration being attained, said stimulus being conducted between the primary ground means and the default ground means through at least a portion of the aircraft, vessel, or vehicle;
- a control means capable of controlling a current flow therethrough in response to the stimulus from the detection means; and
- an external circuit which is respectively activated or deactivated in response to said current flow,
whereby the primary grounding means is selectively and conductively connected to at least one of the body, fuselage, or frame member of the aircraft, vessel, or vehicle and the default grounding means is conductively connected to at least one of the fuel hose, spout, fuel port, or reservoir such that said default grounding means is electrically and conductively connected to said one of the body, fuselage, or frame member to which the primary grounding means is connected such that the stimulus is provided through the primary grounding means and the default grounding means to actuate the control means when the predetermined grounding configuration is attained, the control means further activating or deactivating the external circuit.

26. The fuel dispensing system of claim 25 wherein the default grounding system is automatically and conductively connected to the one of the body, fuselage, or frame member to which the primary grounding means is connected when the spout is placed in fluid communication with the fuel port.

27. The fuel dispensing system of claim 25 wherein the detection means and the control means comprise a field effect transistor.

28. The fuel dispensing system of claim 27 wherein the field effect transistor is an N-channel junction type field effect transistor.

* * * * *

UNITED STATES PATENT AND TRADEMARK OFFICE
CERTIFICATE OF CORRECTION

PATENT NO. : 5,159,523
DATED : October 27, 1992
INVENTOR(S) : Daniel L. Claassen, et al.

It is certified that error appears in the above-identified patent and that said Letters Patent is hereby corrected as shown below:

Column 9, line 43, delete "power supply" and insert --gate means -- therefor;

Column 10, line 5, insert "first" before --grounding--;

Column 10, line 27, delete "claim 1" and insert --claim 6-- therefor;

Column 11, line 23, delete "ground" and insert --grounding-- therefor;

Column 11, line 24, delete "power supply" and insert --gate means-- therefor;

Column 12, line 20, delete "wherein" and insert --whereby-- therefor.

Signed and Sealed this

Twenty-first Day of December, 1993

Attest:

BRUCE LEHMAN

*Attesting Officer*  *Commissioner of Patents and Trademarks*